(No Model.)

B. KEMPER.
CULTIVATOR.

No. 269,677. Patented Dec. 26, 1882.

WITNESSES:
W. W. Hollingsworth
W. Read

INVENTOR:
B. Kemper
BY
ATTORNEYS.

UNITED STATES PATENT OFFICE.

BERNHART KEMPER, OF MUSCATINE, IOWA.

CULTIVATOR.

SPECIFICATION forming part of Letters Patent No. 269,677, dated December 26, 1882.

Application filed May 25, 1882. (No model.)

*To all whom it may concern:*

Be it known that I, BERNHART KEMPER, of Muscatine, in the county of Muscatine and State of Iowa, have invented a new and useful Improvement in Sweet-Potato Cultivators; and I do hereby declare that the following is a full, clear, and exact description of the same, reference being had to the accompanying drawings, forming a part of this specification, in which—

Figure 1:
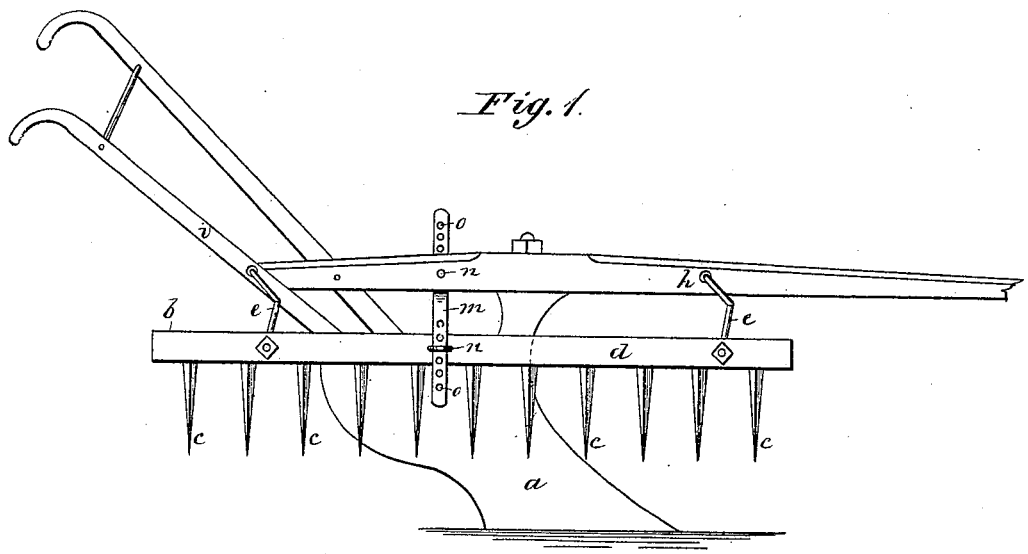
Figure 2:
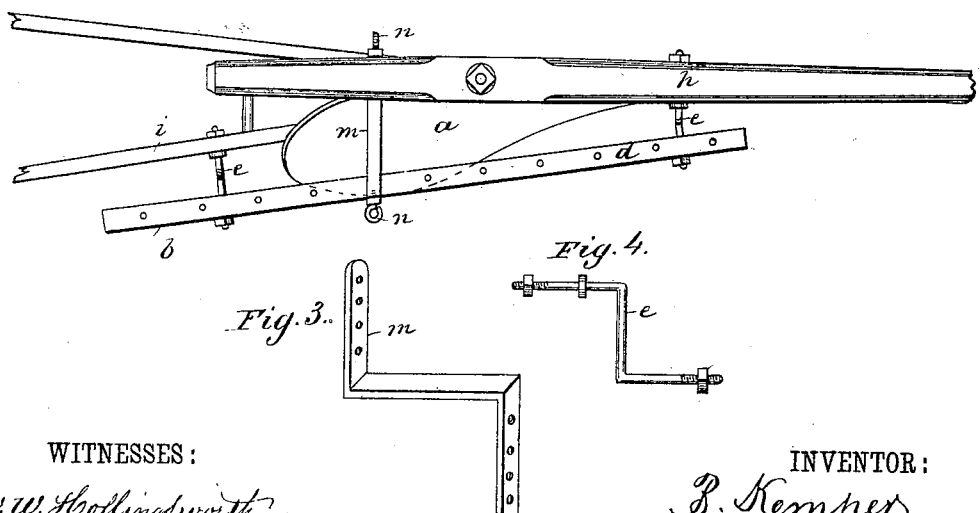
Figures 3, 4:

Figure 1 is a side elevation of my improved sweet-potato cultivator. Fig. 2 is a plan view, and Figs. 3 and 4 are detail views.

The object of my invention is to remove the sweet-potato vines from between the rows of sweet-potatoes, and lay them on the ridges of the rows without injury to the vines, and at the same time cultivate the spaces between the potato-rows; and to this end my invention consists in the combination, with a sweet-potato cultivator, of an inclined rake adjustably secured to the cultivator, whereby in the forward movement of the latter the sweet potato vines are removed from between the rows and laid on the ridges of the rows by the inclined rake, clods are prevented from getting on the vines, and the spaces between the rows cultivated and raked close to the roots of the vines, as hereinafter more fully set forth, and pointed out in the claim.

In the accompanying drawings, *a* represents an ordinary furrow-plow, which may be employed as the cultivator; or a double-shovel plow or any other cultivator may be used to work in the usual manner between the sweet-potato rows.

*b* represents a rake of ordinary construction, provided with vertical tines *c*, secured in the usual manner in the rake-head *d*. The rake *b* is inclined, and secured to the plow *a* parallel, or nearly so, with the mold-board by means of crank-arms *e*, each passing transversely through the rake-head *d* in a horizontal direction a short distance, thence bent upward vertically, forming a right angle with the horizontal part for a short distance, thence bent horizontally, forming a second right-angular part, which is threaded to receive a nut on its outer end. One of the crank-arms *e* passes transversely through the inclined rake-head *d* near its forward end, the opposite end of the bolt *e* passing transversely through the plow-beam *h*, and secured thereto by a nut. The other crank-arm *e* passes transversely through the rake-head *d* near its rear end, the opposite end of the bolt *e* passing through the plow-handle *i*, and both crank-arms *e* are provided with nuts and collars, by means of which the rake can be adjusted. The rake *b* is thus pivotally suspended from the plow-beam *h* and plow-handle *i* by the crank-arms *e*, and is adapted to be swung in the arc of a vertical circle, thereby raising and lowering the rake. The latter is held firmly in place by the angular bar *m*, constructed similarly in shape to the crank-arms *e*, and provided with holes *o* in its ends for the pins *n*, which pass also through corresponding holes in the plow-beam and rake-head. By this construction the rake can be vertically adjusted, as desired.

I am aware that an adjustable clod-fender or rake has heretofore been employed, and I therefore lay no claim broadly to such construction, my invention being confined to the precise construction and arrangement of the parts pointed out in the claim, whereby the sweet-potatoes are cultivated and the vines are removed from between the rows and laid on the ridges, clods are prevented from getting on the vines, and the ridges raked close to the roots of the vines.

Having thus described my invention, what I claim, and desire to secure by Letters Patent, is—

The combination, with the plow *a*, provided with the beam *h* and handles *i*, of the inclined rake *b*, pivotally connected to the beam and one of the handles by the crank-arms *e*, and adjustably held in any desired position parallel with the beam by means of the angular perforated bar *m* and pins *n*, substantially as and for the purpose set forth.

BERNHART KEMPER.

Witnesses:
H. H. HEINE,
I. A. KERR.